INVENTOR
FRANCIS F. LEE

BY David [signature]
ATTORNEY

COUNT — 26c

TRANSLATE

TRANSLATE LOAD 3,348,205
UNIVERSAL CODE TRANSLATOR
Francis F. Lee, Norristown, Pa., assignor to Sperry Rand Corporation, New York, N.Y., a corporation of Delaware
Filed Feb. 6, 1963, Ser. No. 256,612
12 Claims. (Cl. 340—172.5)

Figures 1, 1A:
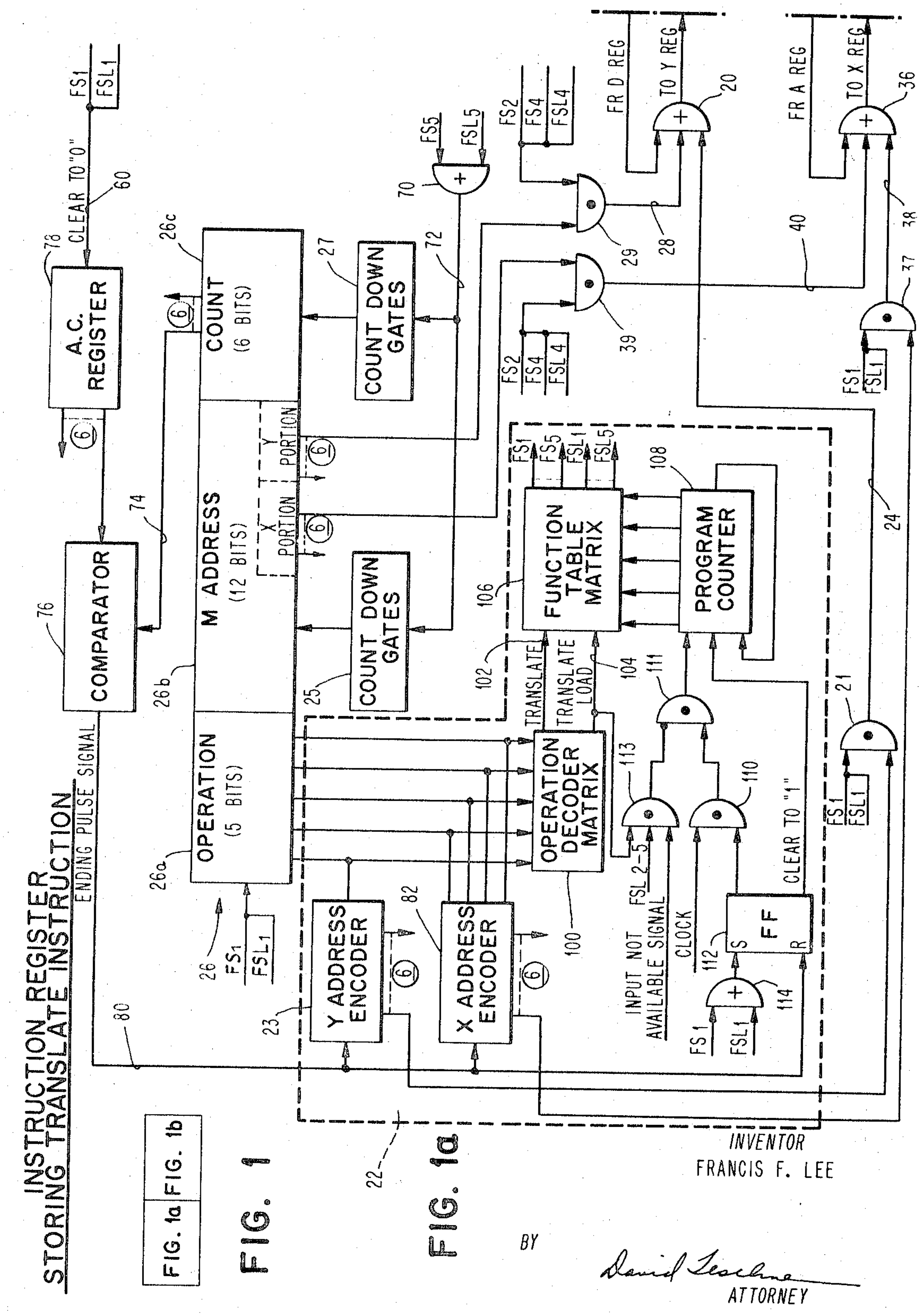

This invention relates to a code translating device, and more particularly to a universal code translating system wherein any desired input code may be converted to any desired further output code.

In recent years electronic digital computing devices and data processing systems have gained wide acceptance in the industrial and scientific fields. The computers and data processing systems employed are often developed for particular purposes related to the special fields of interest. In addition to variations in the type of arithmetic apparatus, input-output apparatus and programming facilities available, the different computing systems often vary as to the type of code which is employed to represent information handled thereby. These codes may be selected solely on the basis of simplicity or the resulting internal construction of the computer or data processing system. Further, these codes are sufficiently different to prevent the use of information coded according to a first system with devices coded according to other systems. Thus, there arises the problem of translating information coded according to a first system into information coded according to a further coding system so that the information or results obtained by certain processing and computing systems may be employed with further different systems. The employment of translating devices permits the widest possible use of computing facilities and available data.

In the prior art devices the procedures for translation or conversion of data have been severely limited. In the usual arrangement, data available in a first code, one easy for the operator to handle, was converted to a second code, by means of a conversion system. The output of the conversion system would be in the particular code which the machine was arranged to handle thus relieving the operator of the task of learning the machine code. Devices constructed to permit such translation were generally diode or resistance matrices into which the input code was set, on the first coordinate axis. The desired output code could then be read from the second coordinate axis of the matrix. The connections between the two coordinate axes were physically established for the desired input and output code relationship and could not be varied. Thus, if it were desired to make available extensive code translation facilities, a plurality of such matrices would have to be prepared and properly switched according to the input and output codes. Such translating apparatus became involved and costly as the desire for flexibility of machine coding became greater.

Further prior art devices as exemplified by the patent to Angel et al. 3,011,165, issued Nov. 28, 1961, employed gating networks in conjunction with a translation matrix to permit the acceptance by the matrix of more than a single input code. These devices, however, produced outputs at a single machine code and were permanently prewired to accept only preset input codes. In order to allow these devices to translate further input codes or to produce further output codes, it might be necessary to add further conversion matrices with more involved gating networks. Such schemes increase the complexity of the computing device, require greater numbers of components and still resulted in relatively inflexible translation schemes.

Briefly stated, the instant invention provides a system of data translation from a large variety of input codes to a large variety of output codes employing a flexible programmable translation scheme. The device does not require additional matrices for storage of its code translation facilities, but rather employs the main memory of the computing system itself. At particular locations within such a main memory are located equivalent tables of input characters in prescribed or desired output codes. Thus in loading the memory originally with the equivalents for various output codes, the point at which the code is loaded is made such that the location described by the input code character stores the output code equivalent for the particular input code character. In this manner no particular locations in the memory are permanently associated with particular characters to be translated directly as is done in many of the prior art translating devices. The input character to be converted is placed in a first selection register which serves to describe the particular location at which is stored in advance the equivalent in a particular output code of the input code character. The particular code equivalent group which is used to convert the input code to a desired output code is picked by the value which is fed into a second selection register in a manner to be described. Thus, for any character configuration which can be established in the first selection register the equivalent which may be read out in different codes will depend solely upon the value in the second selection register. There is no particular relationship between the configuration of bits of the input code and the read out equivalent in terms of direct connections to specific locations in the memory. The character input bits merely serve to define locations for the pre-inserted equivalents.

As many of these equivalent tables as is desired, may be stored within such a memory consistent with the memory size and structure and the structure of the information which could be stored and handled by the associated device. Further, since these equivalent tables are restored in the memory in the same manner as data would be, they may be varied at will to store further equivalent tables, thus permitting the conversion to further output codes from differing input codes. The equivalent tables within the memory may then be addressed by the usual addressing means of the machine to select the particular table desired. For example, in the instance where the memory is a coincident current selection magnetic core matrix, the output code desired establishes a first coordinate selection whereas the individual bits of the digit to be converted establish the second coordinate selection. The value stored in the memory at the address selected by the first and second coordinates will then be the equivalent of the desired output code.

The use of the same memory to store both data and translation equivalents permits information stored within the memory to be read out converted to a desired output code and then returned to its original location to be available for further computing or data processing steps. Thus, the equipment required for such translation is greatly reduced and the overall procedure is simplified. In addition, a very important aspect is the universality of the translation which is available by such a scheme. The machine may thus be adapted to handle most any desired input code and produce outputs in many desired output code.

It is therefore an object of this invention to provide a universal code translating system which is flexible in operation and simple to construct.

It is yet another object of this invention to construct the universal code translating device which employs the common available components of an existing computing or data processing device.

It is still another object of this invention to provide a universal code converting device which can be made to handle most desired input and output codes.

It is still a further object of this invention to provide a universal code converting device employing a coincident current selection matrix wherein the output code desired establishes a first coordinate section and the digits of the data to be converted establish the second coordinate selection.

Still another object of this invention is to provide a data conversion scheme wherein equivalents in desired output codes are stored in a memory to be selected by the concurrence of the desired output code and the digit to be converted in a particular input code.

It is still another object of this invention to provide a universal code translating system wherein the translating information equivalents and the stored data are located within the same memory unit.

It is yet another object of the invention to provide a universal code translating system wherein information transmitted to a storage memory may be translated prior to storage therein.

Other objects and features of the invention will be pointed out in the following description and claims and illustrated in the accompanying drawings which disclose, by way of example, the principle of the invention, and the best mode which has been contemplated for carrying it out.

Figure 1B:
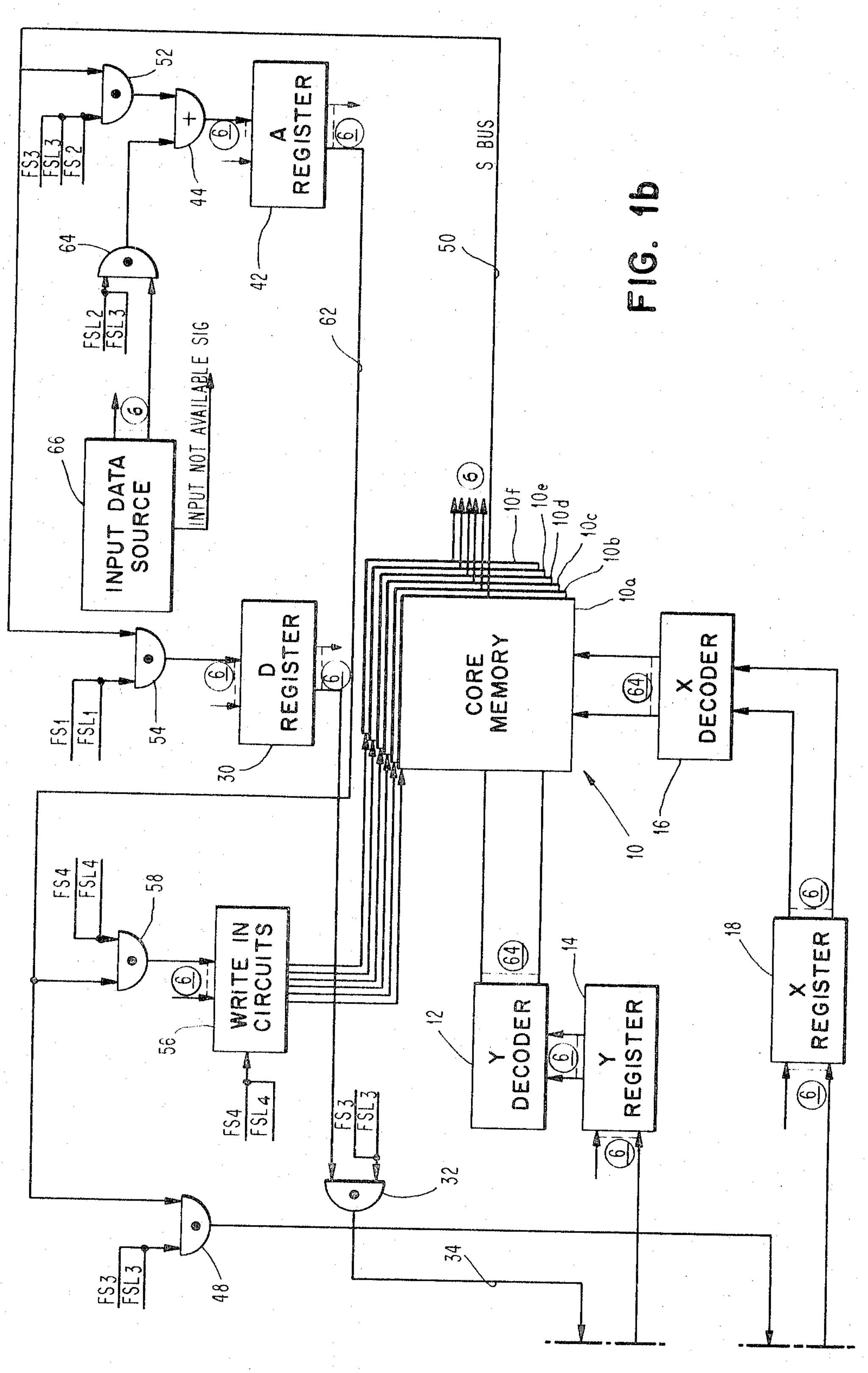

In the drawings:

FIGURE 1 consisting of FIGURES 1*a* and 1*b* illustrates the preferred embodiment of a universal code translating device constructed in accordance with the concepts of this invention.

Figure 2:
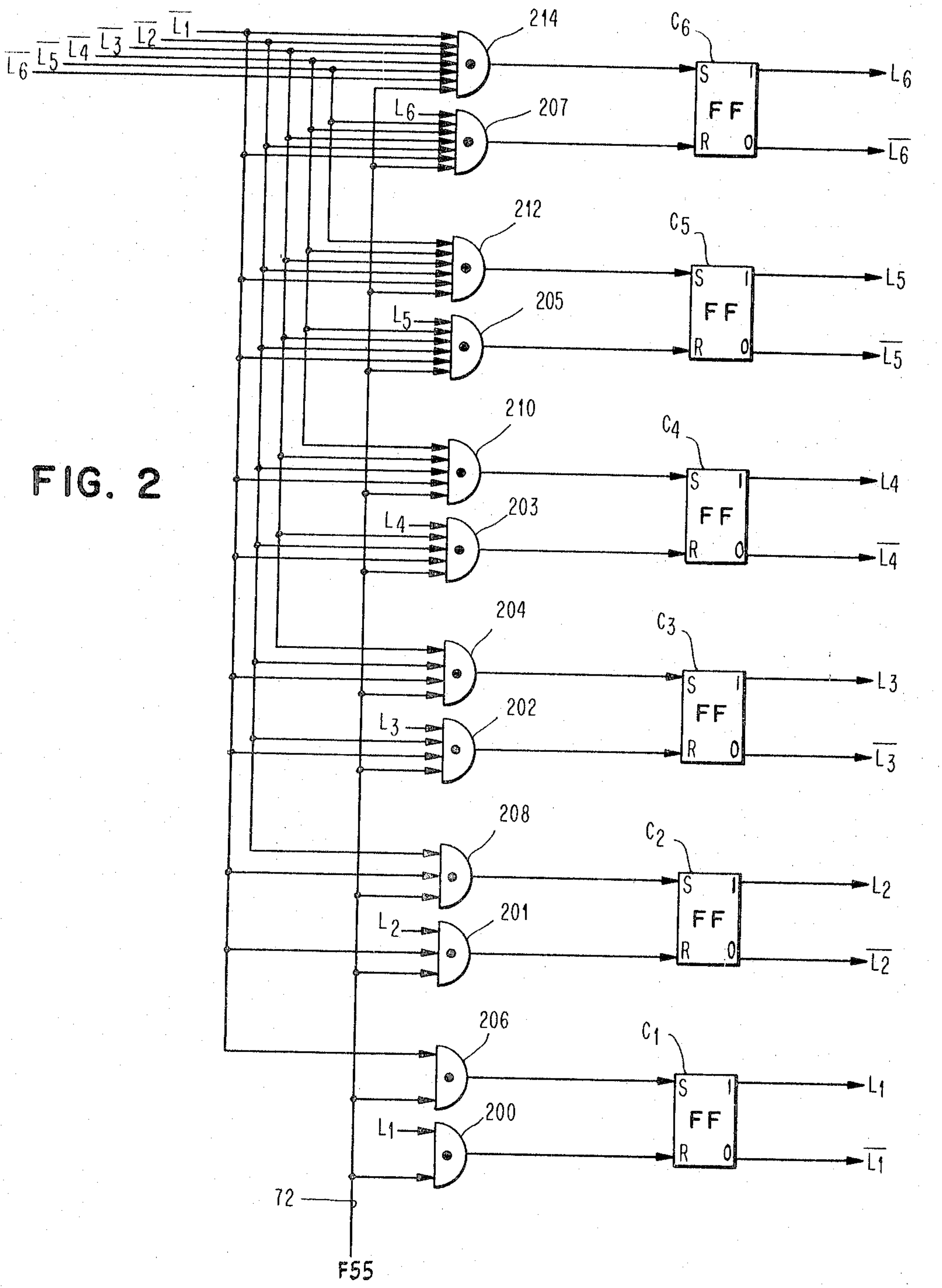

FIGURE 2 illustrates a register with count down gates employed with the device of FIGURE 1.

Figure 3A:
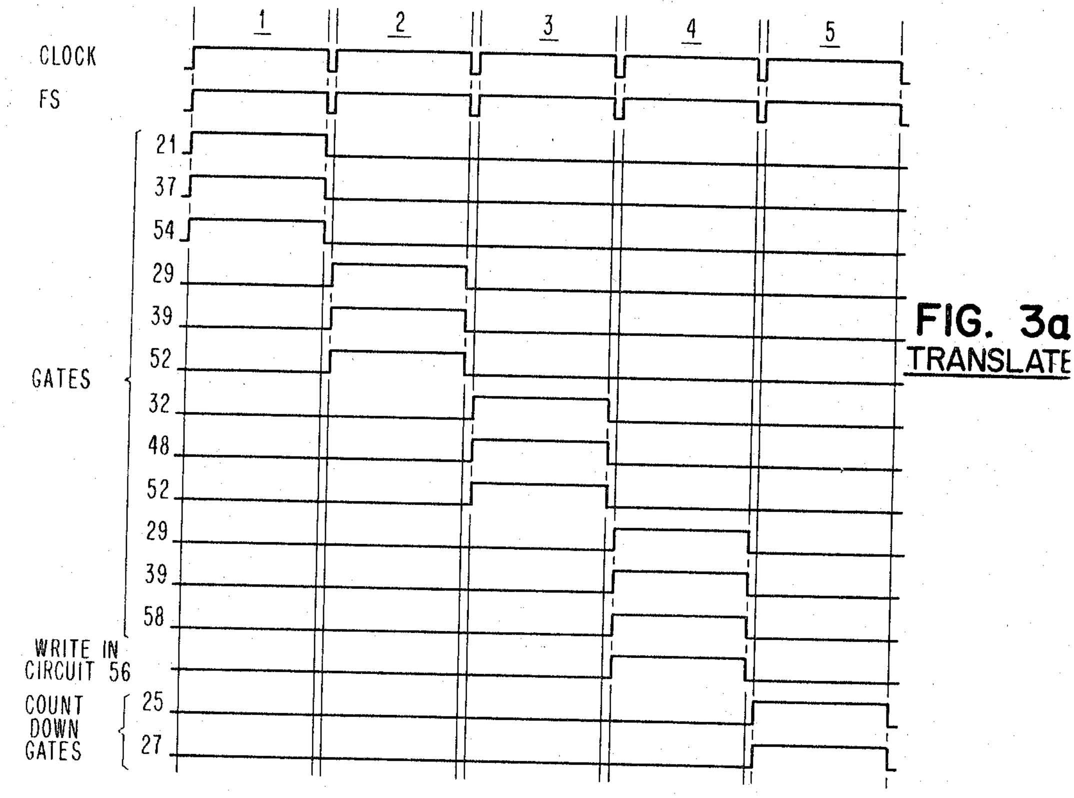
Figure 3B:
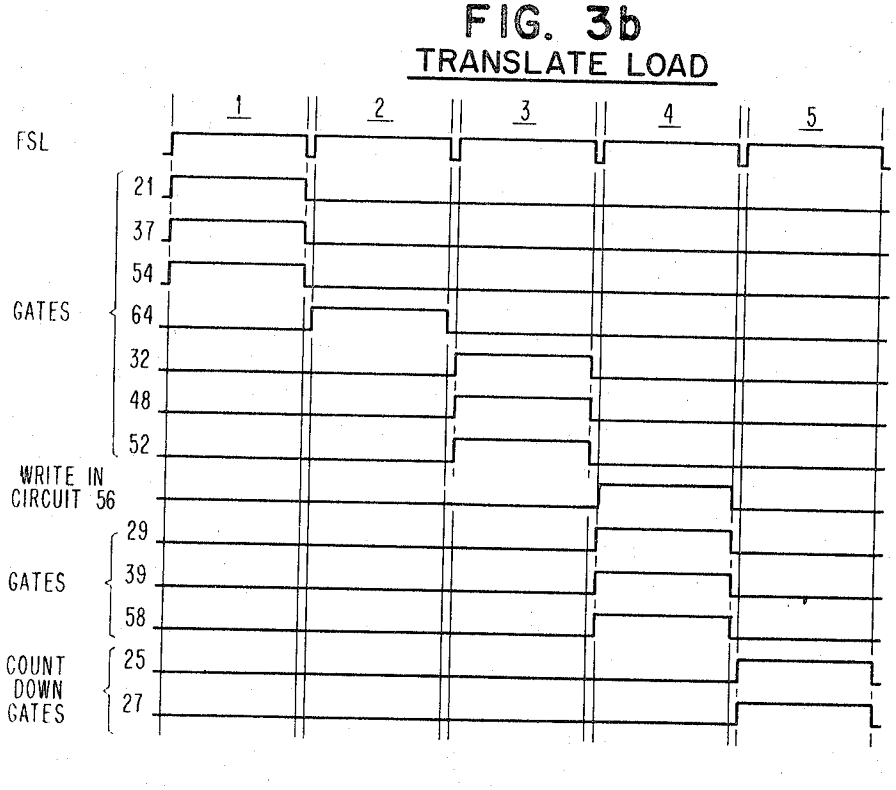

FIGURE 3 composed of FIGURES 3*a* and 3*b* in a timing diagram for the device of FIGURE 1 when operating in the translate and translate-load modes, respectively.

Similar elements are given similar reference characters in each of the respective figures.

Referring to FIGURE 1 there is shown a 64 x 64 coincident current selection magnetic core memory matrix 10. This matrix provides a total of 4,096 individual storage locations at which the various digits of data or code equivalents may be stored. The bits of each complete digit are arranged in a plurality of planes designated 10A through 10F located along the Z axis. Thus, at any particular location which may be designated by the coincidence of the X and Y axes points, the bits of the particular digit selected will be read from all similar X and Y coordinate locations from each of the planes located along the Z axis. In the example shown there are 6 bits for each digit location. It should be understood that the number of planes may be increased or decreased as is desired, as may be the individual size of the respective planes.

Locations within the matrix may be selected by means of a Y decoder 12 and its associated Y register 14 and an X decoder 16 and its associated X register 18. Data indicative of the address along the X and Y axis are stored respectively in the X register 18 and Y register 14. These registers are of well known type and may be constructed, for example, of 6 flip-flops which are settable in accordance with the address desired. Further these registers will be cleared by the introduction of new inputs to store therein values entered. The registers, as shown, store 6 bits giving a possible combination of 64 discrete values. The 6 bits in registers 18 and 14 are fed to the respective decoders 16 and 12 where they select one of 64 lines along each of the respective coordinates. Thus, for each 6-bit combination placed in the respective registers, one line will be selected by each of the decoders. The desired location will be at the coincident point of these selected lines. As is well known in the computing art the current provided by each of the X and Y decoders will be insufficient to switch any core by itself. However, at the point of coincidence between the X and Y selection lines, sufficient current will be developed to permit such switching. Thus, only at the points of selection may the values be read out. It should be understood that the selection of a particular X–Y coincident point results in a similar actuation of the same X and Y point in each of the planes of the matrix making possible read-in or read-out of all the bits of one digit at the same time. It will be noted that the numerals contained within the circles in the respective connecting lines represent the total number of lines in that particular line group. Thus, the 6 in the circle between the X register 18 and the X decoder 16 indicate that 6 lines connect the X register 18 to the X decoder 16. In a similar fashion the 64 contained within the circle of the line group from the X decoder 16 to the core memory 10 indicate that 64 lines connect the core memory to the X decoder. This convention is employed throughout the drawing to simplify the required connections.

Further, to simplify the drawings, only a single gate is shown for each of the respective functions. It should be understood, however, that if a 6 line group connects to a single gate, that gate is considered to be reproduced to provide six such gates, one for each line.

Information may be placed in the Y register by means of an "OR" gate 20. Inputs to "OR" gate 20 are provided by (1) the Y address encoder 23, via "And" gate 21 and line 24, (2) the M address register portion **26*b* of the instruction register 26 via "And" gate 29 and line 28 or (3) the output of the D register 30 via the gate 32 and the line 34. The conditions under which such transfer will take place to the Y register will be described below. In a similar fashion, information may be transferred to the X register via the "OR" circuit 36 from (1) the X address encoder 82 via "And" gate 37 and line 38, (2) from the M address section 26*b* of the instruction register 26 via "And" gate 39 and the line 40 or (3) from the A register 42 via "And" circuit 48**. The conditions under which transfer of information will result from each of these respective input sources will be described in greater detail below.

The output of the core memory 10 is conducted along a line 50, also known as the S-bus, to the input "AND" gate 52 of the A register 42, as well as the input of "AND" gate 54 of the D register 30. Information may be placed in the core memory 10 via the input "AND" gate 58 by the write-in circuits 56. The inputs to the "AND" gate 58 are supplied along the line 62 from A register 42. The A register 42 is connected to the output of "OR" circuit 44 which in turn receives as inputs the outputs of gates 52 and 64. Gate 64 is in turn connected to receive the output of input data source 66.

The instruction register 26 is composed of a large number of flip-flops which receive and store the various component parts of the instruction word. The register is subdivided into subgroupings to receive these component parts, and each subgroup operates as an independent register. In addition to the storage function of the register, certain of the subgroups are provided with countdown gates to permit a value originally placed in said register to be reduced. The first of these subgroups is the operation section **26*a* which is composed of five flip-flops to store the five bits of the instruction word which designate the operation to be performed by the central processor (not shown). In the particular examples described herein, the operation section would store a coded value indicative of the translate operation as well as the X and Y addresses for the code location. The operation section 26*a* outputs are fed to the sequence controls and function signal generator 22 to provide the requisite function and timing signals for the device's operation. The next subgroup or M-address section 26*b* is composed of sixteen flip-flops to store the twelve bits of the M-address part of the instruction word. The M-address part is used to specify the address in the memory at which the character to be translated is stored. The M-address is further divided into an X address portion and a Y address portion each of six bits to completely specify the desired character address. As previously set forth, the Y portion is fed over the line 28, through the "OR" circuit 20 to the Y register 14 where it is employed to cause the selection along the Y axis of memory 10. The X portion of the M-address is conducted along the line 40 to the "OR" circuit 36, to the X register 18 where it is employed to cause the selection along the X axis of memory 10. The third subgroup 26***c* is the count section which is composed of six flip-flops to store the six count bits of the instruction word. The count section indicates the number of digits which will be translated during the translate operation.

In addition to storing information the M-address and count subgroups 26*b* and 26*c* of the instruction register 26 also are provided with countdown gates, to permit values originally placed in these subgroups when receiving the instruction word, to be reduced to prescribed values which may in certain cases be zero. These count down gates 25 and 27 for the M-address and count subgroups 26*b* and 26*c*, respectively, illustrated in FIGURE 1 are shown in greater detail in FIGURE 2. Referring now to FIGURE 2 the manner of operation of these gates may readily be understood. FIGURE 2 shows the arrangement of the countdown gates of the six bit count subgroup 26*c* and arranged to count according to the binary system of notation. A similar arrangement is provided for the X and Y sections of the M-address subgroup. Each of the count flip-flops $C_1$ to $C_6$ of Section 26*c* has a gate associated with its zero and one input sides. These gates are provided with inputs which include the outputs of the flip-flops lower in the chain, the output of the complementary side of the flip-flop and a subtract 1 line. More particularly, if flip-flop $C_3$ is examined, for example, it can be seen that the zero input receives signals from an "AND" gate 202 whereas the one input receives signals from an "AND" gate 204. "AND" gate 202 receives the zero outputs of the $C_2$ flip-flop ($\bar{L}_2$) and the $C_1$ flip-flop ($\bar{L}_1$). If further receives the one input ($L_3$) of the subject flip-flop as well as the subtract 1 signal on the line 72 from the sequence control and function signals generator 22. "And" gate 204 receives the zero outputs $\bar{L}_2$ and $\bar{L}_1$ of the flip-flops $C_2$ and $C_1$. In addition "And" gate 204 receives the zero output ($\bar{L}_3$) of the subject flip-flop and the subtract 1 signal.

Thus if it is assumed that flip-flops $C_3$, $C_2$, and $C_1$ store a one, a zero and a zero respectively and a subtract 1 signal is applied the following resulting conditions will be found. All input conditions for gate 202 are met so it will pass a signal to set flip-flop $C_3$ to the zero state. The flip-flop $C_2$ will be set to a one by the subtract pulse, the inputs $\bar{L}_2$ and $\bar{L}_1$ to "AND" gate 208 both being present. Similarly flip-flop $C_1$ will be set as a result of the signal passed by "AND" gate 206. The inputs to gate 206 being merely the complementary output of the subject flip-flop. Thus the value of four (100) standing in the flip-flops $C_3$, $C_2$ and $C_1$ has been reduced to three (011). The remaining gates operate in the same manner.

Turning again to FIGURE 1 an input data source 66 is provided to supply new information to the memory 10 which information may be new data or new equivalent values as is desired. The manner of its operation will be set forth below.

The value stored in the count subgroup 26*c* of the instruction register 26 is sensed via the line 74 by means of a comparator 76. The second input to the comparator 76 is provided by the A.C. register 78. Upon agreement between the signal on line 74 and the output of the A.C. register 78, the comparator 76 will provide an ending pulse signal on the line 80 to the sequence controls and function signal generator 22.

The sequence controls and function signals generator 22 provides all of the signals necessary for the device to perform a desired translate operation. The signals stored in five flip-flops of section 26*a* which store the operation part of the instruction word, are read into an X encoder 82 and a Y encoder 23 to produce signals indicative of the location of the translate equivalents locator. The first bit is read into the Y encoder 23, which may be a resistance, diode or core matrix of well known type, produces the Y address portion in six bits. It should be noted that the operation code bits might also be employed to directly describe the equivalent address and thus eliminate the double referral system described, if a decrease in the flexibility of the conversion system is permitted by the requirements of a particular system. Further, the number of operation code bits may be increased to permit selection from among more than one location address on the same core plane or a number of core planes, each with their own groups of equivalents. Also, additional operation bits can be used to select a quadrant of the matrix whereas the incoming code bits in excess of those required to the X selection might be used to define the Y selection within the selected quadrant. The next three bits of the instruction word pass into the X encoder (also a resistance diode or core matrix) which produces the X address portion in six bits. These address portions are then conducted to their respective Y and X registers 14 and 18 respectively. The fifth operation bit is not employed in the address generation procedure and serves only to differentiate between the translate and translate-load operations. As will be explained below the translate procedure will be the same regardless of which mode is used, but the control signals which must be generated are different due to the originating locations of the information to be translated.

The sequence control and function signal generator 22 as stated above is employed to decode the operation code contained in subgroup 26*a* and cause the production of the requisite signals to carry out the described operation. The generator 22 consists of an operation decoder matrix 100 which may also be of well-known type (resistance, diode or core) capable of receiving and decoding the outputs of the five flip-flops of the operation subgroup 26*a*. The operation decoder matrix 100 will, in response to its inputs, produce an output on the line 102 for the translate operating and an output on the line 104 for translate load instruction. Other outputs will be produced in response to further operation codes, however, in that these are not germane to the present discussion they are not considered further nor illustrated.

The outputs of the operation decoder matrix 100 are applied to the function table matrix 106 which will produce the signals (FS1 to FS5 and FSL1 to FSL5) necessary to control the movement of information within the device. This matrix may also be of the resistance, diode or core type. The output from the operation decoder matrix 100 serves to alert a series of matrix positions, in the matrix 106 which will produce control outputs upon the application of program counter signals from program counter 108 as described below. In response to a translate signal on line 102, a series of signals FS1, FS2, FS3, FS4 and FS5 will be generated in sequential steps. The following events will take place during these steps:

FS1—read out value from operation section 26*a*
—initiate sequence control and function generator 22
—generate X and Y locator addresses
—read out memory at locator address
—place contents read at locator address in D register.

FS2—read out M address from section 26*b*
—staticize X and Y address portions in registers 18 (Y) and 14 (Y).
—read out of memory at the described M address.
—read contents found at M address into the A register.

FS3—read out contents of D register to register 14 (Y)
—read out contents of A register to register 18 (X)
—read out contents of memory address described by the contents of the A & D registers
—read value read out into A register.

FS4—read out M address from section 26*b*
—staticize X and Y address portions in registers 18 (X) and 14 (Y)
—read out contents of A register —actuate write-in gates
—read digit into memory at M address
FS5—advance countdown gates
—return to step 1 and generate FS1

In response to the translate-load signal on line 104, a series of signals FSL1, FSL2, FSL3, FSL4 and FSL5 will be generated. The following events will take place during these respective steps:

FSL1—read out operation section 26*a*
—initiate sequence control and function generator 22
—generate X and Y locator addresses
—read out memory at locator address
—place contents read at locator address in D register
FSL2—read out input data from data source 66
—place input data in A register
FSL3—read out A register contents to register 18 (Y)
—read out D register contents to register 14 (Y)
—read out contents at address described by A and D registers
—place contents in A register.
—alert Write-In gates
FSL4—read out address in M address section.
—staticize X and Y address portions in registers 18 (Y) and 14 (Y).
—read contents of A register to the location specified by the registers 18 and 14 the M-address.
FSL5—decrement M address by one.
—decrement count section by one.
—return to step FSL2.

As was stated above the various matrix points to be employed for generating the required function signals are alerted by the action of the operation decoder matrix signals. The signals required to produce the function signals in timed sequence are the output signals of the program counter 108. The program counter is a five-stage closed ring counter wherein the output of the fifth stage produces an input to the first stage. Counters of this type are well known in the art and will not be described in detail. The program counter is stepped by the output of an "And" gate 111 in conjunction with a further "And" gate 110 which receives clock pulses from the central processor clock (not shown) as well as a control signal from the set output of the flip-flop 112. The program counter 108 is reset to a count of one by the reset output flip-flop 112. In this manner as soon as a signal is available from the operation decoder matrix 100, the signals FS1 or FSL1 may be generated. The generation of later function signals depend upon the stepping of the program counter 108. The flip-flop 112 is set by the output of "Or" gate 114 which receives inputs of FS1 or FSL1 to permit the flip-flop 112 to be set and thus provide control signals to "And" gate 110 to admit clock pulses to step the program counter. The flip-flop 112 is reset by the ending pulse signal on line 80, to stop the generation of function signals at the end of the translate or translate-load operation. A further "And" gate 113 is provided to produce an inhibitory signal to the "And" gate 111 to prevent stepping the program under certain special conditions as will be described below. The "And" gate 113 is responsive to the input not available signal produced by the input data source 66, the function signal FSL2 and the translate-load signal.

The ending pulse signal is generated by the comparator 76, which continually monitors the count section 26*c* as it is stepped down during each function signal sequence, when the count in the count section agrees with the zero value stored in the AC register 78. This ending pulse signal in addition to terminating function signal generation also clears the X encoder 80 and Y encoder 23. The "And" and "Or" circuits, as well as the flip-flop registers are of types well-known in the art and will not be described further. The comparator 76 is also well-known in the art and is arranged to provide an output upon the concurrence of the two input signals for which comparison is sought. The input data source 66 may be of any convenience type, such as an input keyboard, a tape reader, a punch card reader, etc.

The manner of operation of the device in one of its operative modes will now be set forth. It should be understood that the device may be operated to translate data from an external source or data already stored within the memory. In the ensuing example the second manner of data input will be used, in other words, data originally stored within the memory will be translated by the use of equivalents also stored in the same memory. The translated value will then be returned to the memory location occupied by the data originally. This mode of operation is called the "Translate Operation." It should be understood that the translated data may also be read out to other using devices (not shown).

Refer now to FIGURE 3*a* which illustrates a timing diagram for the Translate Operation together with the apparatus shown on FIGURE 1.

The instruction as described above will be set up in the instruction register 26. The operation subgroup 26*a* of the instruction register 26 receives the bits which describe a translate operation. In addition, the values stored in the operation subgroup will provide the address of the location in the memory where is stored the locator for the equivalents in the desired output code. The location of the locator will be the same for all the translations. The value at the locator address will be varied according to the conversion to take plate. That is the address found at the locator address will be the address of a particular code conversion equivalent table. Further the operation subgroup provides signals from which are derived the various function signals as previously explained. The M-address subgroup 26*b* stores the address of a character in the memory which is to be translated during the translate operation. In the event that a series of characters is to be translated the address stored in the M-address section will be the location of the first digit to be translated. The value stored in the M-address subgroup 26*b* will be diminished by one for each character translated to furnish a new address, which is the address of the next digit to be translated, etc. The procedure is continued until stopped as described above. Although the device has been described to operate in a counting down manner, it should be understood that count up gates could be substituted and the M-address subgroup augmented by one to arrive at the address of each succeeding digit to be translated. The final subgroup of the instruction register, the count subgroup 26*c* stores a value which indicates the total number of characters which are to be translated during the translate operation. This section also has count down gates which permit the value stored therein to be reduced. Thus for each digit translated the value stored in the count subgroup will be decreased until a zero value is reached at which time the operation is terminated. Count up gates could also be employed with the count section in which case the complement of the desired count value would be set into the count subgroup. Under this condition the A.C. register 78 would be set to the number of desired translations and count section would initially store a zero.

When the translate instruction is received in register 26, the operation portion is decoded by matrix 100. Matrix 100 produces a signal on the translate line 102 which is connected to function table matrix 106. In response to a signal on line 102 and the output of the program counter 108 (presently at a count of 1) the matrix 106 produces the FS1 signal. The FS1 signal alerts gates 21, 37 and 54 and clears register 78 to 0. Further, the FS1 signal is applied via "OR" circuit 114 to set flip-flop 112.

The first output of the sequence controls and function signals generator 22, as described above will be the address in the memory of the locator which furnishes the address describing the location of the stored equivalents. By means of this double referral, the output code into which input characters may be translated can be changed merely by changing the address found at the locator address and without altering the instruction in any manner. This first address that is the address of the locator will be composed of an X portion and a Y portion. The X portion will be generated by X Encoder 82 and is fed via gate 37, the line 38, and the "Or" circuit 36 to the X register 18. The values stored in the X register will be decoded by the X decoder 16 to provide a single line along the X axis of the core memory. The Y portion generated by the Y encoder 23 will be fed via gate 21, the line 24 and the "Or" circuit 20 to the Y register 14. In a similar fashion, the Y decoder 12 will receive the contents of the Y register and designate a particular single line of the core memory along the Y axis. The first location in memory 10 thus is designated by interpretation of the function code itself and will be the same for all translate operations. The value stored at this first designated address or locator address of the equivalent table is read out via the line 50, or the S-bus to the "And" gate 54 wherein the function signal FS–1 permits its introduction to the D register 30 for temporary storage.

The program counter 108 is thereafter stepped by a clock signal which is transmitted thereto through gates 110 and 111. The new output (count of 2) of the program counter 108 in combination with the translate signal on line 102 causes the matrix 106 to produce the FS2 signal.

At function signal FS–2, the Y address portion of the M address from section 26b is read over the line 28, "And" gate 29 to the input of "Or" circuit 20 where it is then stored in the Y register 14. In a similar fashion, the X portion is read via the line 40, the "And" circuit 39 to the input of "Or" circuit 36 and the X register 18. Following the receipt by the respective registers 18 and 14 of the X and Y portions of the M address, the values stored at the particular location designated by these two address portions is located and read out. This value is the first character to be translated. The value so located is transferred along the S-bus 50 to the input of the "And" circuit 52. "And" circuit 52 is actated by function signal FS–2 to permit transmission of this information to the A register 42. In this manner the first character designated by the M address is read out and stored temporarily in the A register 42. The next clock signal is transmitted through gates 110 and 111 to step the program counter 108 to a count of 3. The new output of the program counter 108 in combination with the translate signal on line 102 causes matrix 106 to produce the signal FS3. At function signal FS3, the output of the D register 30 is applied to the "And" gate 32 to permit the storage of a new row address in the Y register 14 via the "Or" gate 20. The value as will be recalled, stored in the D register is the row address of the particular equivalent table corresponding to the desired conversion from the input to the output code. Further, at this time, that is during the occurrence of function signal FS3 the information stored in the A register 42 which is the value of the lowest significant character to be converted, will be read out via the line 62, "And" circuit 48, and the "Or" circuit 36 to the input of the X register 18. Thus, the value of the lowest significant character will provide the column or X address whereas the value stored in the Y register will provide the row or Y address. The equivalent which is stored in the matrix at this coordinate point will now be the equivalent in the particular output code of this input character.

The value read from the core memory 10 as a result of the selection by the contents of the Y and X registers during time when function signal FS–3 is available is now conducted over the S-bus 50 to the input of the "And" gate 52. Function signal FS–3 also is connected to "And" gate 52 to permit the storage of this value in the A register 42. The next clock signal steps the program counter 108 to a count of 4 and in response to this value as well as the signal on the translate line 102, matrix 106 produces the FS4 signal. Function signal FS–4 causes the Y address portion in section 26b of the previously read lowest significant digit to be returned via the gate 29, the "OR" circuit 20 to the Y register 14 where it is decoded by the Y decoder 12. In a similar fashion, during the function signal FS–4, the X address portion of section 26b is read through the "AND" circuit 39, the line 40, the "OR" circuit 36 to the X register 18 where it is decoded by the X decoder 16. The function signal FS–4 also actuates the write-in circuits 56 to permit values read from "AND" gate 58 to be read into the memory 10 at the locations specified by decoders 12 and 16. As a result of the re-application of the M-address that is the address of the least significant character, the location formerly occupied by the least significant character in the storage is made ready to accept the equivalent value just read out. Thus during function signal FS–4, the contents of the A register 42 is read along the line 62 to the input of "AND" gate 58. This signal is conducted through the gate at function signals FS–4 to operate the write-in circuits 56 and thus replace the equivalent value at the location formerly occupied by the least significant character. The next clock pulse transmitted through gates 110 and 111 step the program counter 108 to a count of 5. This count causes the matrix 106 to generate the FS–5 signal. Upon the occurrence of the following function signal FS–5 which effects a subtract 1 operation, the value stored in the M address section 26b of the instruction register 26, as well as the count section 26c, are made to decrease by one as described above. This occurs via "Or" gate 70 and count down gates 25 and 27. The next clock signal causes the program counter 108 to be recycled to a count of 1 whereby the matrix 106 again produces FS–1. This permits a new character to be drawn from the matrix and converted from the input code to the desired output code, in the fashion described above. This conversion operation continues until a zero count in the count section 26c of the instruction register 26 occurs. The detection of the zero count will be achieved in the following manner: When the device is originally set for translation the A.C. register 78 is made to store a zero by means of a signal on line 60. This signal indicative of zero will be fed as a first input to the comparator 76. As was noted above, the output of the count section 26c of the instruction register 26 is conducted along the line 74 to a second input of the comparator 76. Upon the count standing in the count section reaching zero, there will be a concurrence or agreement between the signals of the count section and that of the A.C. register. Upon the detection of this comparison, the comparator will issue a signal known as the ending pulse signal on the line 80 to the sequence controls and functions signals generator 22. The ending pulse signal will arrive before the function table matrix can return to step one and again produce an FS–1 signal. This ending pulse signal will indicate that the prescribed number of digits have been converted and that the operation is now complete. This ending pulse signal will have the effect of preventing the further generation of function signals by resetting flip-flop 112 and thus preventing clock pulses from passing through "AND" gate 110 and advancing program counter 108.

In addition to the translation of information already stored in the memory 10, information may be translated as it is loaded into the memory from an external input data source, such as a tape or card reader, keyboard or other input device. When the operation called for by the bits of the operation section 26a is the translate load operation, information received from the input data source 66 will be translated according to the procedure described above and then deposited at a location specified by the M address. The timing diagram for the translate load operation is shown in FIGURE 3*b*. More specifically, the instruction translate load will be decoded by the operation decoding matrix 100 and due to the last bit, as set forth above, will cause an output over the line 104 to the function table matrix 106. In response to this input a different group of matrix locations will be alerted to produce outputs in response to the clock signals. The first bit of the operation sections 26*a* will cause Y address encoder 23 to produce the Y coordinate of the locator address in six bits, as set forth above. The next three bits of the operation section 26*a* will cause the X address encoder 82 to produce the X coordinate of the locator address in six bits as set forth above. The first function signal FSL1 generated in response to the signal on line 104 only, will further cause the A.C. register 78 to be set to zero as a result of the application of function signal FSL1 being applied to the line 60. The flip-flop 112 will be set by the output of the "OR" gate 114 which receives function signal FSL1 as one of its inputs. Further the output of the Y address encoder 23 will be conducted through "AND" gate 21 under the control of function signal FSL1. The output of "AND" gate 21, as set forth above is fed via "OR" gate 20 to Y register 14 and finally to Y decoder 12 where it establishes the Y coordinate of the location address. The output of the X address encoder 82 passes through "AND" gate 37 under the control of function signal FSL1 as an input. The output of "AND" gate 37 passes over line 38 to an input of "OR" gate 36, thence to X register 18 and X decoder 16. In response to this input, X decoder 16 establishes the X coordinate of the locator address. The value found at the locator address is read during function signal FSL1 through "AND" gate 54 to the input of D register 30.

The following clock pulse steps the program counter 108 causing function signal FSL2 to be generated. This signal applied to the "AND" gate 64 permits data from input data source 66 to be read into the A register 42 via the "OR" gate 44.

To insure that the translate-load operation cannot proceed unless data is available from the input data source 66, the program counter 108 is prevented from stepping to permit the function table matrix 106 to produce function signal FSL3. This is accomplished by means of the "AND" gate 113. The "AND" gate 113 is made responsive to the translate load signal on line 104, the function signal FSL2 and the input not available signal produced by the input data source. This input not available signal is produced any time that data is not in such a position in the input data source 66 so that it may be transferred to the A register 42. For example, an input keyboard may produce such a signal when all of the keys required to enter a complete character OR message have not been depressed. As soon as the required keys have been depressed this signal will terminate preventing "AND" gate 113 from generating the inhibit signal to "AND" gate 111. Thus upon the occurrence of the following clock signal the program counter will be stepped and cause the function table matrix 106 to produce the function signal FSL3. At FSL3 the A register 42 is read out via line 62, "AND" gate 48, "OR" gate 36 to X register 18. The contents of the X register 18 are decoded by X decoder 16 to select the X coordinate. Further the contents of the D register 30 are read out via "AND" gate 32, line 34, "OR" gate 20, Y register 14, the Y decoder 12 to select the Y coordinate selection line. The value read at this point in the memory 10 is then returned to the A register 42 via "AND" gate 52 and "OR" gate 44.

The next clock pulse causes the regeneration of function signal FSL4. During this function signal period the write-in circuits 56 are alerted and the M-address is read from the M address section 26*b*. The X portion goes via "AND" gate 39, "OR" gate 36, X register 18, X decoder 16 to select the X coordinate drive line. The Y portion goes via "AND" gate 29, line 28, "OR" gate 20, Y register 14, Y decoder 12 to select the Y coordinate drive line. The contents of the A register 42 is read via line 62, "AND" gate 58, write-in circuits 56 and placed at the location called for by the M-address. Finally at function signal FSL5 the count-down gates 25 and 27 receives the FSL5 signal via "OR" gate 70 to cause the M-address section 266 and count sections 26L to be reduced by one. The next clock pulse steps the program counter 108 so that the operation may continue on the incoming data. Thus the storage location of the next incoming data will be in the next lower storage address. The translate and load operation will continue until the count section 26*c* goes to zero at which time the ending pulse signal will be generated to stop further operation as described above.

While there have been shown and described and pointed out the fundamental and novel features of the invention as applied to the preferred embodiment, it will be understood that various omissions and substitutions and changes of the form and details of the device as illustrated and its operation may be made by those skilled in the art, without departing from the spirit of the invention.

The embodiments of the invention in which an exclusive property or privilege is claimed are defined as follows:

1. A universal code translator for translating a plurality of input characters each character presented in a sequential manner; input means for receiving each character in sequence, said characters being coded according to one of a plurality of data processing codes; a count storage means for storing a value indicative of the number of characters in the sequence to be translated; first means to cause said count storage means to count down from said stored value by one each time a character is received by said input means; a conversion indicating means for receiving an indication of the output data processing code to which said input code is to be translated; an addressable storage means for storing the equivalents of a plurality of said input codes in a plurality of said output codes, said storage means employing at least two address portions to designate a single code address; second means responsive to said conversion indicating means for establishing a first address portion of said storage means address according to the desired output code; third means responsive to said input receiving means for establishing the second of said address portions; fourth means coupled to said addressable storage means for reading out said equivalent output code stored at the address defined by said address portions and fifth means responsive to said count storage means to prevent further operation of said code translator when the value stored in said count storage means reaches zero.

2. A device as claimed in claim 1, wherein a sixth means is provided to alter the equivalents stored in said storage means, to represent equivalents of said input codes in different output codes.

3. A universal code translator comprising: a coincident current selection magnetic core matrix for storing at discrete addresses coded data characters and equivalents of said coded data characters in a plurality of output codes; means coupled to said matrix to address said matrix comprising a first coordinate value indication storage means and a second coordinate value indication storage means, said first and second coordinate values permitting the selection of said discrete addresses within said matrix; first means to cause said addressing means to select and read out from said matrix a first data character; second means responsive to said first data character to insert said character in said first coordinate value storage means as the first coordinate value; a conversion indicating means for receiving an indication of the output data processing code to which said data character is to be translated; third means responsive to said conversion indicating means to insert said indication in said second coordinate value indication storage means as the second coordinate value; said second means further being responsive to the equivalents read out from said matrix to reinsert said equivalent in the matrix at the address described by said first means.

4. A device as claimed in claim 3, wherein a fourth means is provided to alter the equivalents stored in said storage means, to represent equivalents of said input codes in different output codes.

5. A device as claimed in claim 4, further including a counting means adapted to receive a value indicative of a number of sequentially presented data characters to be translated, said counter value being decreased by one each time the translation of a data character is completed and further adapted to stop the operation of the translator upon reaching a value of zero.

6. A universal code translator comprising: a coincident current selection magnetic core matrix for storing at discrete addresses coded data characters and equivalents of said coded data characters in a plurality of output codes, means coupled to said matrix comprising a first coordinate value indication storage means and a second coordinate value indication storage means for storing coordinate values, said first and second coordinate values permitting the selection of said discrete addresses within said matrix; a multi-section instruction register for receiving and storing the values contained in at least a first, a second and a third portion of an instruction, at least two of said sections further being able to be counted up or down from the instruction value originally stored therein; a switching network responsive to said first section value of said instruction register during a first time period, to set first values into said first and second coordinate storage means and cause the value stored in the matrix at the discrete address defined by said coordinate means to be read out; first register means connected to said matrix to store the first value so read; said switching network responsive to said second section value of said instruction register during a second time period to set second values into said first and second coordinate storage means and cause the value stored in the matrix at the discrete address defined by said coordinate means to be read out; second register means connected to said matrix to store the second value so read; said first coordinate value indication storage means being further responsive to said first register means and said second coordinate value indication storage means being further responsive to said second register means to read out the equivalent stored at the discrete address defined by said first and second coordinate means; said second register means being responsive to cause said equivalent read from said matrix to be reinserted into said matrix at the discrete address set in accordance with said second section value; a control means connected to said switching network to provide timing signals and further responsive to the completion of said reinsertion to cause said instruction register sections storing said second and third values to be reduced by one and means response to a value of zero in said instruction register section storing said third value to terminate further translation.

7. A device as claimed in claim 6, wherein a further means is provided to alter the equivalent stored in said matrix, to represent equivalents of said input codes in different output codes.

8. A universal code translator for translating a plurality of input characters, each character presented in a sequential manner comprising: an addressable storage means for storing at discrete addresses coded data characters and equivalents of said coded data characters in a plurality of output codes; a first coordinate value indication storage means and a second coordinate value indication storage means for receiving and storing coordinate values, said first and second coordinate values permitting the selection of said discrete addresses of said addressable storage means; a multi-section instruction register, having at least a first, a second and a third section for receiving and storing the values contained in the first, second and third portions of an instruction respectively, the second and third sections of said instruction register further having gates coupled thereto to permit the values originally set into said second and third sections to be increased or decreased; a switching network responsive to the value stored in said first section during a first time period, to set first coordinate values into said first and second coordinate value storage means, said coordinate value storage means being effective to cause the value stored in the addressable storage means at the discrete address defined by the first coordinate values, to be read out; first register means coupled to said addressable storage means, to receive and store the first value so read; said switching network responsive to the value stored in said second section of said instruction register, during a second time period to set second coordinate values into said first and second coordinate value storage means, said coordinate value storage means being effective to cause the value stored in the addressable storage means at the discrete address defined by the second coordinate values to be read out; second register means connected to said addressable storage means to receive and store the second value so read; said first coordinate value indication storage means being further responsive to the contents of said first register means and said second coordinate value indication storage means being further responsive to the contents of said second register means to read out the equivalent stored at the discrete address defined by the contents of said coordinate value indication storage means; means to return said equivalent value to said second register means; said switching network responsive a second time to the value stored in said second section during a third time period to reset said second coordinate values into said first and second coordinate value storage means; third means connected to and adapted to cause the contents of said second register to be read out and stored at the discrete address defined by the contents of said coordinate value stores when storing the values from said second section; a control means connected to said switching network to provide timing signals and further responsive to the completion of said reinsertion of said equivalent to cause said gates to permit said second and third section stored values to be decreased by one, said reduction by one occurring for each one of said characters translated; and means responsive to a value of zero in said third instruction register section to terminate further translation.

9. A device as claimed in claim 8, wherein a further means is provided to alter the equivalent stored in said addressable storage means, to represent equivalents of said input codes in different output codes.

10. A universal code translator for translating a plurality of input characters, each character presented in a sequential manner comprising: an addressable storage means for storing at discrete addresses coded data characters and equivalents of said coded data characters in a plurality of output codes; a conversion indicating means capable of storing a value indicative of the output code to which said input character is to be translated; an input means adapted to receive in sequence input characters coded according to one of a plurality of input codes; first coordinate selection means coupled to and responsive to the value stored in said indicating means to establish a first coordinate of addresses stored in said addressable storage means; second coordinate selection means coupled to and responsive to the value stored in said input means to establish a second coordinate of the addresses stored in said addressable storage means and thus permit the equivalent stored at the particular discrete address described by said first and second coordinate selection means to be read out; third means coupled to said addressable storage means to receive said equivalent; fourth means coupled to said first and second coordinate selection means to insert a value indicative of the discrete address in said addressable storage means for storing at discrete addresses stored and means to read out the contents of said third means to the discrete address so selected.

11. A universal code translator for translating a plurality of input characters, each presented sequentially from an external source, prior to storage comprising: an addressable storage means for storing at discrete addresses coded data characters and equivalents of said input characters in a plurality of output codes; a controllable source of input characters, capable of presenting individual characters in a sequential fashion, first register means coupled to and adapted to receive and store said input characters; a first coordinate selection device coupled to said addressable storage means, and adapted to receive and store data defining a first coordinate of said discrete addresses of said storage means; a second coordinate selection device coupled to said addressable storage means and adapted to receive and store data defininining a second coordinate of said discrete addresses of said storage means; a multi-section instruction register, having at least a first, a second and a third section for receiving and storing the values contained in the first, second and third portions of an instruction respectively; the second and third sections of said instruction register further having gates coupled thereto to permit the values originally set into said second and third sections to be increased or decreased; a switching network responsive to the value stored in said first section during a first time period, to set first coordinate values into said first and second coordinate selection devices, said selection devices being effective to cause the value stored in the addressable storage means at the discrete address, defined by the first coordinate values, to be read out; second register means coupled to said addressable storage means and adapted to receive and store the value read from said addressable store in response to said first coordinate values; means coupling said first register means to said second coordinate selection device to permit the value stored in said first register means to be transferred to said second coordinate selection device, as a second coordinate value, during a second time period; means coupling said second register means to said first coordinate selection device to permit the value stored in said second register means to be transferred to said first coordinate selection device, as a second coordinate value during said second time period; said first and second coordinate selection devices being effective during said second time period to cause the equivalent value stored in the addressable storage means at the discrete address defined by said second coordinate values to be read out; means coupling said addressable storage means and said first register means to permit said first register means to receive the equivalent read from said addresasble storage means at the discrete address established by said second coordinate value; said switching network responsive to the value stored in said second section of said instruction register, during a third time period to set third coordinate values into said first and second coordinate selection devices, said coordinate devices being effective to select a further discrete address in accordance with said third coordinate value; means coupling said first register means to said addressable storage means to permit the contents of said first register means to be placed in said addressable storage means at the discrete address defined by said third coordinate value; a control means coupled to said switching network, and said first and second register means to provide timing signals and further responsive to the completion of the insertion of said equivalent at the location defined by said third coordinate value to cause said gates to decrease the value stored in said second and third instruction register sections by one, said reduction by one occurring for each one of said characters translated; said control means further controlling said source of input characters to apply a further input character to said first register means; and means responsive to a value of zero in said third section of said instruction register to terminate further translation.

12. A device as claimed in claim 11, wherein a further means is provided to alter the equivalent stored in said addressable storage means, to represent equivalents of said input codes in different output codes.

References Cited

UNITED STATES PATENTS

| | | | |
|---|---|---|---|
| 2,866,506 | 12/1958 | Hierath et al. | 164—115 |
| 2,959,351 | 11/1960 | Hamilton et al. | 235—153 |
| 3,074,636 | 1/1963 | Baker et al. | 235—157 |
| 3,083,903 | 4/1963 | Larson | 235—61.6 |
| 3,098,222 | 7/1963 | Freedman | 340—347 |
| 3,132,245 | 5/1964 | Harper | 235—155 |
| 3,202,971 | 8/1965 | Blaauw | 340—172.5 |

ROBERT C. BAILEY, *Primary Examiner.*

I. S. KAVROKOV, *Assistant Examiner.*

UNITED STATES PATENT OFFICE

CERTIFICATE OF CORRECTION

Patent No. 3,348,205 October 17, 1967

Francis F. Lee

It is hereby certified that error appears in the above numbered patent requiring correction and that the said Letters Patent should read as corrected below.

Column 14, lines 74 and 75, strike out "in said ad- addressable storage means for storing at discrete addresses" and insert instead -- in said addressable storage means where said equivalent is to be --; column 15, line 17, for "definining" read -- defining --.

Signed and sealed this 19th day of November 1968.

(SEAL)
Attest:

Edward M. Fletcher, Jr.
Attesting Officer

EDWARD J. BRENNER
Commissioner of Patents